(12) United States Patent
Hedley et al.

(10) Patent No.: US 10,338,194 B2
(45) Date of Patent: Jul. 2, 2019

(54) WIRELESS LOCALISATION SYSTEM

(71) Applicant: Commonwealth Scientific and Industrial Research Organisation, Campbell (AU)

(72) Inventors: Mark Hedley, St. Leonards (AU); David Eric Humphrey, Carlingford (AU)

(73) Assignee: COMMONWEALTH SCIENTIFIC AND INDUSTRIAL RESEARCH ORGANISATION, Campbell, New South Wales (AU)

( * ) Notice: Subject to any disclaimer, the term of this patent is extended or adjusted under 35 U.S.C. 154(b) by 257 days.

(21) Appl. No.: 15/255,011

(22) Filed: Sep. 1, 2016

(65) Prior Publication Data
US 2016/0370455 A1 Dec. 22, 2016

Related U.S. Application Data

(63) Continuation of application No. 13/002,640, filed as application No. PCT/AU2009/000863 on Jul. 3, 2009, now abandoned.

(30) Foreign Application Priority Data
Jul. 4, 2008 (AU) ................................ 2008903441

(51) Int. Cl.
*G01S 5/02* (2010.01)
*G01S 5/14* (2006.01)
*G01S 13/87* (2006.01)

(52) U.S. Cl.
CPC .............. *G01S 5/14* (2013.01); *G01S 5/0215* (2013.01); *G01S 5/0226* (2013.01);
(Continued)

(58) Field of Classification Search
CPC ........ G01S 5/14; G01S 13/878; G01S 13/876; G01S 5/0215; G01S 5/0289; G01S 5/0226
(Continued)

(56) References Cited

U.S. PATENT DOCUMENTS 4,799,062 A 1/1989 Sanderford, Jr. et al.
5,056,106 A 10/1991 Wang et al.
(Continued)

FOREIGN PATENT DOCUMENTS

GB 1 351 185 4/1974
JP 6217304 A 8/1994
(Continued)

OTHER PUBLICATIONS

PCT Preliminary Examination Report from PCT/AU2009/000863 dated Jan. 5, 2011 (Year: 2011).*
(Continued)

*Primary Examiner* — Frank J McGue
(74) *Attorney, Agent, or Firm* — Kilpatrick Townsend & Stockton LLP

(57) ABSTRACT

Disclosed is method of computing a round trip delay between a pair of nodes, the method comprising transmitting at least one beacon at a known transmit time from each of the nodes; measuring the times-of-arrival of the beacons at other of the nodes; and estimating a round trip delay between the nodes from the measured times-of-arrival and the transmit times; and correcting the round trip delay for either or both of a frequency offset between the nodes and relative motion between the nodes.

7 Claims, 9 Drawing Sheets

(52) U.S. Cl.
CPC .......... *G01S 5/0289* (2013.01); *G01S 13/876* (2013.01); *G01S 13/878* (2013.01)

(58) Field of Classification Search
USPC ........................................................ 342/387
See application file for complete search history.

(56) References Cited

U.S. PATENT DOCUMENTS

| | | | |
|---|---|---|---|
| 5,438,321 A | 8/1995 | Bernand et al. | |
| 5,469,409 A * | 11/1995 | Anderson | G01S 1/022 |
| | | | 342/450 |
| 5,513,854 A | 5/1996 | Daver | |
| 5,583,517 A | 12/1996 | Yokev et al. | |
| 5,600,706 A * | 2/1997 | Dunn | G01S 5/10 |
| | | | 342/450 |
| 5,805,108 A | 9/1998 | Lennen | |
| 5,822,363 A | 10/1998 | Le Roy | |
| 5,859,613 A | 1/1999 | Otto | |
| 5,912,644 A | 6/1999 | Wang | |
| 5,931,889 A * | 8/1999 | Misra | G01S 19/20 |
| | | | 342/358 |
| 6,054,950 A | 4/2000 | Fontana | |
| 6,169,497 B1 | 1/2001 | Robert | |
| 6,185,428 B1 | 2/2001 | Kingdon et al. | |
| 6,204,813 B1 | 3/2001 | Wadell et al. | |
| 6,259,894 B1 | 7/2001 | Tekinay | |
| 6,275,705 B1 | 8/2001 | Drane et al. | |
| 6,414,634 B1 | 7/2002 | Tekinay | |
| 6,433,731 B1 * | 8/2002 | Sheynblat | G01S 5/0009 |
| | | | 342/357.62 |
| 6,469,665 B2 | 10/2002 | Porcino | |
| 6,483,461 B1 | 11/2002 | Matheney et al. | |
| 6,504,483 B1 | 1/2003 | Richards et al. | |
| 6,795,491 B2 | 9/2004 | Fleming et al. | |
| 6,804,494 B2 | 10/2004 | Fernandez-Corbaton et al. | |
| 6,831,603 B2 | 12/2004 | Menache | |
| 6,968,194 B2 | 11/2005 | Aljadeff et al. | |
| 7,009,561 B2 | 3/2006 | Menache et al. | |
| 7,026,992 B1 | 4/2006 | Hunt et al. | |
| 7,286,624 B2 | 10/2007 | Woo et al. | |
| 2001/0030625 A1 | 10/2001 | Doles et al. | |
| 2002/0196186 A1 | 12/2002 | Holt | |
| 2003/0092448 A1 * | 5/2003 | Forstrom | G01C 21/206 |
| | | | 455/456.1 |
| 2005/0026563 A1 | 2/2005 | Leeper et al. | |
| 2006/0066485 A1 | 3/2006 | Min | |
| 2006/0224308 A1 * | 10/2006 | Schmidt | G01S 13/876 |
| | | | 701/300 |
| 2008/0130604 A1 * | 6/2008 | Boyd | G01S 5/021 |
| | | | 370/338 |
| 2009/0121867 A1 * | 5/2009 | Park | G01S 5/0252 |
| | | | 340/539.32 |
| 2011/0188389 A1 | 8/2011 | Hedley et al. | |

FOREIGN PATENT DOCUMENTS

| | | |
|---|---|---|
| JP | 2005-070019 A | 3/2005 |
| WO | 98/37932 A1 | 9/1998 |
| WO | 99/53339 A1 | 10/1999 |
| WO | 01/66201 A1 | 9/2001 |
| WO | 02/087261 A2 | 10/2002 |
| WO | 2004/040327 A1 | 5/2004 |
| WO | 2004/044606 A2 | 5/2004 |
| WO | 2007/002286 A2 | 1/2007 |

OTHER PUBLICATIONS

Doherty, L., et al., "Convex position estimation in wireless sensor networks," INFOCOM 2001. Twentieth Annual Joint Conference of the IEEE Computer and Communication Societies. Proceedings. IEEE in INFOCOM 2001. IEEE, Apr. 22-26, 2001, pp. 1655-1663, vol. 3.

Extended Search Report for European Application No. 09771853.0, dated Aug. 8, 2011, 11 pages.

Examination Report for European Application No. 09771853.0, dated Aug. 9, 2012, 4 pages.

Examination Report for Australian Application No. 2009266425, dated Apr. 22, 2013, 3 pages.

* cited by examiner

WIRELESS LOCALISATION SYSTEM

CROSS-REFERENCES TO RELATED APPLICATIONS

This application is a continuation of U.S. patent application Ser. No. 13/002,640, filed Mar. 23, 2011, which claims priority to U.S. National Stage International Application No. PCT/AU2009/000863, filed Jul. 3, 2009, and which claims priority to Australian Provisional Application No. 2008903441, filed Jul. 4, 2008, the entire disclosures of which are incorporated by reference herein.

FIELD OF THE INVENTION

The present invention relates generally to wireless localisation, and in particular to tracking objects using radio signals based on measurement of the time-of-arrival.

BACKGROUND

There are many applications in which it is desirable to track or locate objects or people, such as: tracking athletes for training or providing event information in real time; tracking emergency services or military personnel in buildings and urban environments; tracking staff, patients, and equipment in hospitals and nursing homes; and tracking staff and equipment in industrial, hazardous or mining environments for safety and automation.

A wireless localisation system refers to any system that uses transmission of electromagnetic signals (e.g. radio frequency or microwave) to localise (estimate the location of) an object, in two dimensions or three dimensions. Mobile objects can be localised and/or tracked by attaching a signal-enabled tag to the object and using a set of fixed 'anchor' nodes in the area to be monitored. Inaccuracies in the location estimates arise due to (1) the properties of the radio propagation environment (e.g. multipath reflections and diffraction) and (2) limitations in the system hardware (e.g. lack of time/frequency synchronisation and propagation delays in hardware that are time varying). The latter issues are particularly severe in applications where the anchor nodes have wireless connections and must consist of low-cost hardware.

There are numerous systems for wireless localisation of objects or people. Optical, infra-red and ultrasonic localisation do not work through walls. Amongst radio localisation systems, the various techniques rely on measurement of received signal strength (RSS), time-of-arrival (TOA), and/or angle-of-arrival (AOA). It is well known that in difficult radio propagation environments, RSS techniques have poor accuracy. AOA techniques require expensive hardware to determine the direction of arrival, and may perform poorly in multipath environments where reflections arrive from many directions. A common TOA-based technique is satellite navigation (e.g. GPS); however, this is not possible in indoor environments or even in outdoor environments where the accuracy is significantly degraded by multipath signals (e.g. urban canyons).

The most common TOA-based localisation system uses receiving anchor nodes that are hard-wired (cabled) to the processing hardware (e.g. U.S. Pat. No. 6,831,603). This greatly simplifies the system as a common clock can be shared, eliminating the problem of frequency and time synchronisation. In some situations, such as where rapid installation is required or the region between receiving nodes is inaccessible or inappropriate for cable installation, cabled connections between anchor nodes are impractical.

Where there is wireless connection between anchor nodes, the frequency and time synchronisation problem is often handled by using two way (also known as round trip) localisation, and usually also by the use of a reference node (e.g. US Patent 2003/0092448). This approach transmits a signal from one node to another, followed immediately by a return signal. The time between receiving the forward message and transmitting the reverse message is often assumed to be constant, which is not the case in many practical systems.

Once the distance or 'range' between each mobile node and the anchor nodes has been determined, the location of the mobile nodes is estimated in a process known as 'multilateration'. The most common technique uses a minimum mean squared error (MMSE) approach. With this technique, 'bad' range data can severely affect the estimated locations of the mobile nodes. Another technique with a different assumption on the error distribution is based on Projections onto Convex Sets (POCS); however, conventional POCS algorithms do not handle well the case where there is a large intersection region. As with MMSE, the POCS approach is susceptible to bad data due to effects such as multipath reflections, radio interference and fading phenomena.

SUMMARY

It is an object of the present invention to substantially overcome, or at least ameliorate, one or more disadvantages of existing arrangements.

According to a first aspect of the present disclosure, there is provided a method of computing a round trip delay between a pair of nodes, the method comprising:

transmitting at least one beacon at a known transmit time from each of said nodes;

measuring the times-of-arrival of said beacons at other of said nodes;

estimating a round trip delay between said nodes from said measured times-of-arrival and said transmit times; and correcting said round trip delay for either or both of a frequency offset between the nodes and relative motion between the nodes.

According to another aspect of the present disclosure, there is provided a method of estimating the location of a mobile object using a plurality of ranges between a node associated with said object and respective anchor nodes, the method comprising:

estimating, for a current said range, the location of said object and an error in said location estimate from said range excluding said current range;

discarding the range whose exclusion gave the lowest error estimate, if said lowest error estimate is less than a threshold;

repeating said estimating and said discarding until said lowest error estimate is not less than said threshold or the number of undiscarded ranges reaches a minimum number; and estimating the location of said object from the undiscarded ranges.

According to another aspect of the present disclosure, there is provided a method of estimating the location of a mobile object using a plurality of ranges between a node associated with said object and respective anchor nodes, the method comprising:

projecting a starting point onto a sequence of constraint sets in turn, each said constraint set being a circle centred on one said anchor node with radius equal to the corresponding range, to obtain an end point;

increasing, if said end point is not less than said corresponding range from each said anchor node, at least one said range, and repeating said projecting and said increasing until said location is less than said corresponding range from each said anchor node, wherein said end point is said estimated location of said mobile object.

According to another aspect of the present disclosure, there is provided a method of time synchronising a plurality of anchor nodes, the method comprising:

measuring a plurality of trip delays of beacons transmitted between said anchor nodes;

correcting said trip delays for propagation delays at said anchor nodes and frequency offsets between local clocks at respective said anchor nodes; and determining a time offset of each said local clock from said corrected trip delays.

According to another aspect of the present disclosure, there is provided a method of estimating the location of a mobile object using a plurality of anchor nodes, the method comprising:

synchronising said plurality of anchor nodes;

measuring a plurality of times-of-arrival of beacons transmitted from said object to respective said anchor nodes; and estimating the location of said object relative to said anchor nodes using said measured times-of-arrival, corrected for a propagation delay at each said anchor node.

According to another aspect of the present disclosure, there is provided a system for estimating the location of one or more objects, the system comprising:

a plurality of anchor nodes;

one or more mobile nodes coincident with respective said objects;

beacons transmitted by some or all of said nodes according to a predetermined or dynamically determined schedule; and data capability to send measured times-of-arrival of said beacons, and transmit times of said beacons, to a location server adapted to compute the location of said objects.

According to another aspect of the present disclosure, there is provided a system for estimating the location of an object, the system comprising:

a plurality of anchor nodes adapted to communicate wirelessly with each other by either transmitting or receiving beacons;

a mobile node coincident with said object, the mobile node being adapted to communicate wirelessly with said anchor nodes by either transmitting or receiving said beacons;

a localisation server adapted to:
receive measurements of time-of-arrival of said beacons at said nodes,
select one of a plurality of localisation algorithms dependent on attributes of said anchor nodes and said mobile node, and
estimate the location of said object using said measured times-of-arrival using said selected localisation algorithm.

The disclosed arrangements include a system for wireless localisation and tracking, and methods that can be used in the disclosed system or other systems. The disclosed arrangements estimate object location using multilateration based on measured time-of-arrival (TOA) of radio signals. The disclosed arrangements enable more robust processing and hence more accurate location estimation compared to existing systems and methods in the face of bad data due to typical sources of error such as TOA measurement errors (e.g. due to multipath interference or propagation effects), unsynchronised clocks in nodes, time varying propagation delay through the node electronics, and object motion. The disclosed system, using only low-cost consumer electronic components, is capable of covering large areas (i.e. is not limited to direct radio communication links between all nodes) and is capable of rapid deployment as cabling is not required between any nodes.

BRIEF DESCRIPTION OF THE DRAWINGS

One or more embodiments of the present invention will now be described with reference to the drawings and appendices, in which:

FIG. 8b illustrates the motion of a mobile node during the beacon transmissions of FIG. 8a;

DETAILED DESCRIPTION INCLUDING BEST MODE

Figure 1:
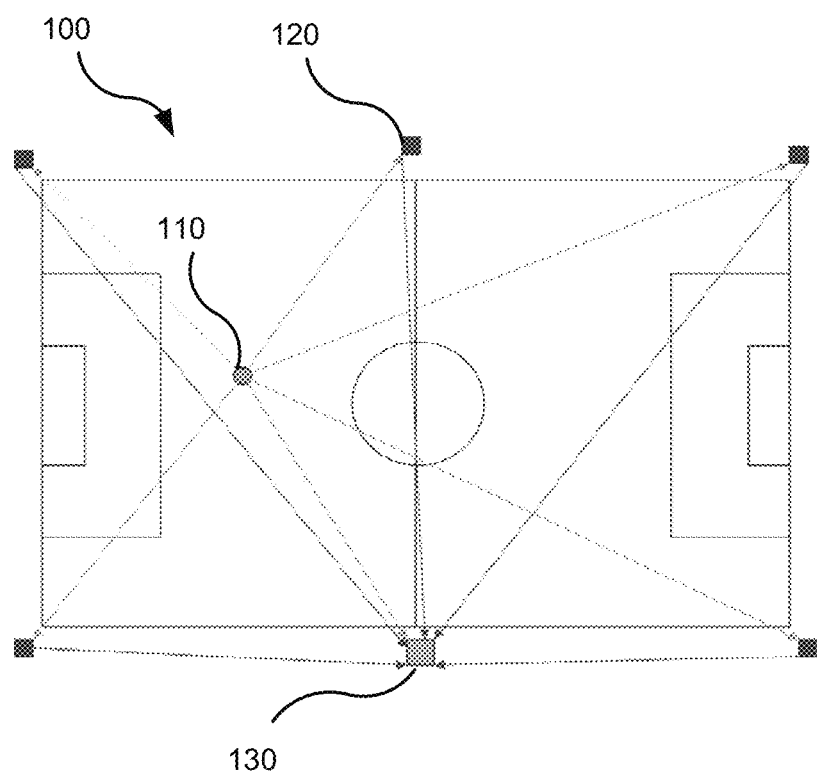
FIG. 1 shows an example of a tracking system within which the disclosed arrangements may be practised.

Where reference is made in any one or more of the accompanying drawings to steps and/or features, which have the same reference numerals, those steps and/or features have for the purposes of this description the same function(s) or operation(s), unless the contrary intention appears.

One application for wireless tracking is in sports such as soccer. FIG. 1 shows an example of a tracking system 100 within which the disclosed arrangements may be practised, comprising one soccer player 110, several fixed anchor nodes, e.g. 120, surrounding the field, and a location server 130. Through the exchange of radio signals between the player 110 and the anchor nodes 120, and the exchange of data between the anchor nodes 120 and the location server 130, it is possible for the location of the player 110 to be estimated at the location server 130. A key feature of the system 100 is that the anchor nodes 120 are wirelessly connected to the location server to simplify deployment (although where convenient a cable or fibre connection can be used and will usually improve system performance).

There are many other applications for such a system, including tracking and communicating with emergency services personnel and hospital staff and patients. Although the present disclosure refers to a single hop network as shown in FIG. 1, the disclosed arrangements are readily extendable to other network topologies including multi-hop and mesh.

The disclosed tracking system comprises:
Mobile Nodes (or tags): These are devices attached to the objects to be tracked. A mobile node contains a radio transceiver and computational resources, and optionally sensors or other sinks or sources of data.
Anchor Nodes: These are devices scattered through the area being monitored at known locations, and communicate wirelessly with mobile nodes and other anchor nodes. Each anchor node contains a radio transceiver and computational resources, and optionally sensors or other sinks or sources of data.
Location Server: This is where the locations of the mobile nodes are estimated using data measured and transmitted by the nodes. The location estimates and other data are made available to other systems not described herein. The location server is preferably a separate physical entity from the anchor nodes, but need not be, and the estimation computations could be performed in one of the anchor nodes, or even be distributed over multiple anchor nodes.

The wireless data communication is preferably performed using direct sequence spread spectrum signalling; however, it could be equally well performed using any radio communication protocol (e.g. the 802.11 family of standards).

Figure 2:
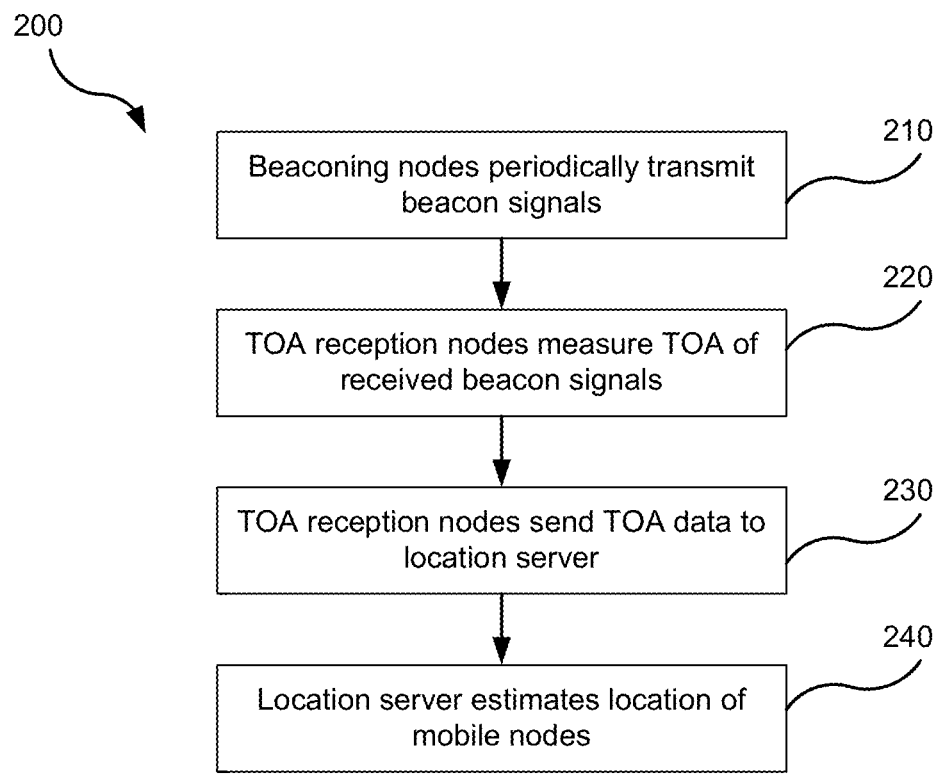
FIG. 2 is a flow diagram illustrating a general method of localisation according to the preferred embodiment.

FIG. 2 is a flow diagram illustrating a general method 200 of localisation according to the preferred embodiment. In step 210 certain nodes called beaconing nodes periodically transmit radio signals called beacons that are received by some other nodes called TOA reception nodes that are able to measure the TOA of the beacon. The beacons contain a localisation signal designed for accurate measurement of TOA and an optional data payload. While the localisation signal could be a data symbol, better results are obtained using a specially designed localisation signal. Depending upon the application, the hardware capability, and the choice of localisation algorithm, the mobile nodes may be beaconing nodes and/or TOA reception nodes, and likewise the anchor nodes may be beaconing nodes and/or TOA reception nodes. For example:
for tracking, the mobile nodes are beaconing nodes and the anchor nodes are TOA reception nodes;
for navigation, in which the mobile nodes need to estimate their own location, the mobile nodes are TOA reception nodes and the anchor nodes are beaconing nodes (this is similar to GPS);
for round trip localisation, both anchor nodes and mobile nodes are both beaconing nodes and TOA reception nodes.

In the disclosed arrangements, a TDMA (time division multiple access) scheme is used for the transmission of the beacons such that only one beacon is sent in each time slot. TDMA is superior to CDMA (code division multiple access) or FDMA (frequency division multiple access) as the former reduces the signal to noise ratio (SNR) at the receivers due to multiple simultaneous transmissions, reducing localisation accuracy, and the latter reduces bandwidth available for the localisation signal, again reducing localisation accuracy.

At step 220 of the method 200, the TOA reception nodes measure the TOA for each received beacon, and at step 230 the TOA reception nodes send the TOA data to the location server (preferably via the data payload in their own beacons, or alternatively via other means such as cable, particularly if a TOA reception node is not also a beaconing node). For some localisation algorithms, the transmit time of beacons is also required, and beaconing nodes can send this to the location server as a data field in the beacon or by other means. There may be other data such as that related to system operation, for protocols, or from sensors, that is also sent to the location server. The location server at step 240 applies a localisation algorithm to the received data to estimate the location of the mobile nodes.

There are three main categories of localisation algorithm:
Round Trip Localisation: Based on bidirectional beacon transmission between pairs of nodes (mobile and anchor): eliminates the requirement for time synchronisation, but requires both mobile and anchor nodes to be both beaconing and TOA reception nodes.
Mobile Transmit Localisation: Localisation is based on a single beacon transmission by a mobile node, and mobile nodes can be simpler than for round trip localisation as they only need to be beaconing nodes. Mobile nodes do not measure TOA, but still need to have a receiver for TDMA synchronisation. Anchor nodes only need to be TOA reception nodes for localisation, but will preferably also be beaconing nodes for time synchronisation amongst themselves and possibly measurement of their propagation delay.
Mobile Receive Localisation: As with GPS, it is possible for the anchor nodes to be beaconing nodes and the mobile nodes to be TOA reception nodes. This category is generally inferior to the previous two localisation algorithm categories, so will not be further described below.

When using wireless localisation and tracking, there are a number of factors that adversely affect the accuracy of the estimation of the location of the mobile nodes, some of which are only relevant for particular localisation algorithms or circumstances:
Errors in the measured TOA can arise due to noise, propagation effects, interference or signal processing artefacts.
Each node has a local clock, and in general the node clocks are not time or frequency synchronised. Time synchronisation is not required for round trip localisation, but correction for frequency offset is still required.
There is a propagation delay of radio signals through the electronics at both the transmitter and receiver nodes. This can be larger than the propagation delay of the radio signals over the air between nodes and must be corrected for.
A mobile node may be in motion during the localisation measurement. As discussed below, this is particularly relevant for round trip localisation.

Figure 4A:
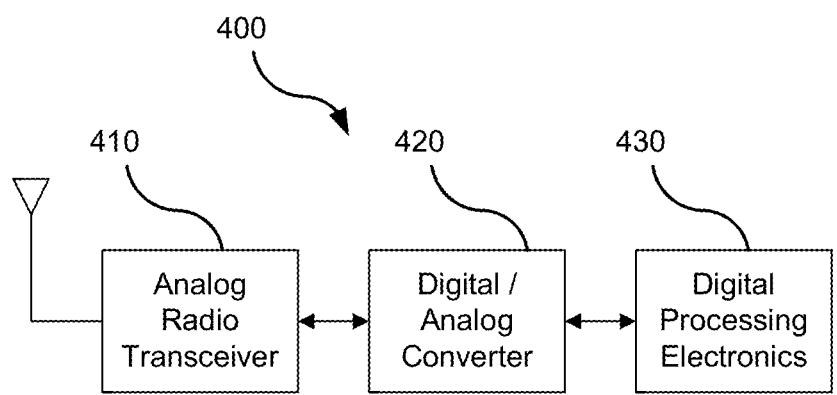
FIG. 4a is an illustration of a beaconing node according to the preferred embodiment.

A beaconing node 400 according to the preferred embodiment is illustrated in FIG. 4a. The beaconing node 400 has digital electronics 430 to generate a beacon and a module 420 to convert the beacon to analog form for radio transmission using a radio transceiver 410 in step 210 of the method 200. The beaconing node 400 also receives data at least to allow synchronisation of TDMA slots, so the data flow in the beaconing node 400 is bidirectional.

Figure 4B:
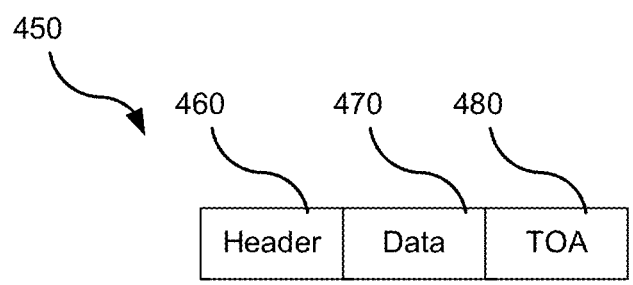
FIG. 4b is an illustration of the format of a beacon according to the preferred embodiment.

The format of a beacon 450 according to the preferred embodiment, comprising a header 460, a data field (payload) 470, and a TOA localisation signal 480, is illustrated in FIG. 4b. The TOA localisation signal 480 is specially designed to maximise the accuracy with which the TOA of the signal is measured by a TOA reception node. In another embodiment, a separate TOA localisation signal 480 is not used and instead a known signal pattern in the header 460 is used to measure the TOA. The data field 470 is optional.

In the preferred embodiment, the beacons 450 are scheduled to minimise self-interference and hence maximise localisation accuracy. The update rate of a mobile node's location estimate is limited to the rate at which that node transmits beacons.

Previous schemes for round trip localisation involved a beacon being sent to a node and a reply being immediately generated. For all nodes involved in the measurement (for time synchronisation, propagation delay measurement or mobile node localisation), there is a beacon sent from each node to each of the other nodes. By contrast, according to the disclosed arrangements for round trip localisation, each beaconing node transmits just one beacon per measurement. The advantage is that the number of localisation signal transmissions is greatly reduced, which can reduce power consumption and/or increase the number of nodes the system can support. Under the disclosed arrangements, there can be large and variable time intervals between the transmissions of beacons between pairs of nodes. As described in detail below, this time interval is measured and adequately corrected for.

Figure 5:
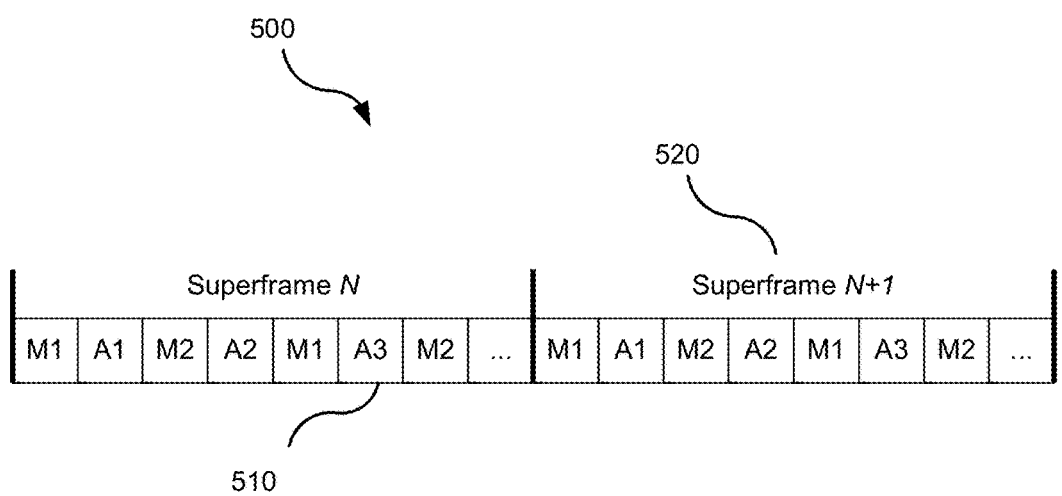
FIG. 5 is an illustration of an exemplary TDMA beacon schedule.

The preferred TDMA scheme 500, with an exemplary schedule, is illustrated in FIG. 5. Time is divided into slots, e.g. 510, with a beacon being sent in each slot by the node corresponding to the slot label (M1 is mobile node 1, A1 is anchor node 1, etc). Where the nodes are distributed over a sufficiently large area to form a multi-hop network, a slot can be used by plural nodes, provided the minimum radio link hop count between the nodes using the same slot is greater than two (hence not all nodes have the same schedule). The slot size will generally be as small as possible, preferably adjustable between 1 ms and 10 ms. The update rate of the beacons is determined by the localisation algorithm category. For round trip localisation, all nodes should transmit at least at the minimum localisation update rate. For mobile transmit localisation, the mobile nodes should transmit at the minimum localisation update rate; however the anchor nodes should transmit at the required rate to maintain time synchronisation, which is in turn dependent upon the stability of the local oscillators in each node.

In FIG. 5, the slots are grouped in superframes, e.g. 520, as this simplifies the TDMA scheme; however, it is not necessary. At each node, the schedule of each superframe is generally the same, except for dynamic behaviour in the network (e.g. mobile nodes moving in and out of range). The scheduling of beacons into slots can be static or dynamic. Static allocation, in which the schedule is known in advance by all nodes, is simpler but does not allow slot reuse in multi-hop networks. Dynamic allocation entails additional communication overhead, either mutually among the nodes according to a distributed algorithm, or between a scheduling controller (e.g. the location server) and the nodes.

Coarse time synchronisation is required between all nodes for the TDMA scheme; however, this only needs to be within a fraction of the slot duration (e.g. one percent, or 10 μs for 1 ms slots), which is readily achieved in nodes designed to measure TOA with high accuracy (typically better than 1 ns). The synchronisation time reference is provided by one of the nodes either by fixed allocation or selection by the nodes themselves (the latter alternative providing robustness should the time reference node fail). This time synchronisation is too coarse to be of any assistance for localisation.

TOA reception nodes are adapted to receive a beacon, convert it to digital form, and process it to measure with high resolution the TOA of the beacon (step 220 of the method 200). A TOA reception node also preferably uses wireless communication to transmit the TOA values to the location server (step 230 of the method 200). In the preferred embodiment, the TOA data is sent to the location server in the data field 470 of the beacon format 450 shown in FIG. 4b. Thus 400 in FIG. 4a equally well represents a TOA reception node according to the preferred embodiment. However, there are greater requirements on the performance of TOA reception nodes compared to beaconing nodes in two ways. Firstly, the processing capabilities required for measuring the TOA are substantially greater than that required for generation of beacons. Secondly, a TOA reception node should have a receiver with greater sensitivity and linearity for high accuracy measurement of TOA than is required just for data reception.

The measurement of the TOA (step 220) is preferably carried out by a TOA reception node according to the method described in the PCT patent application no. PCT/AU2009/000647. However, any technique for the measurement of TOA may alternatively be used.

Figure 6:
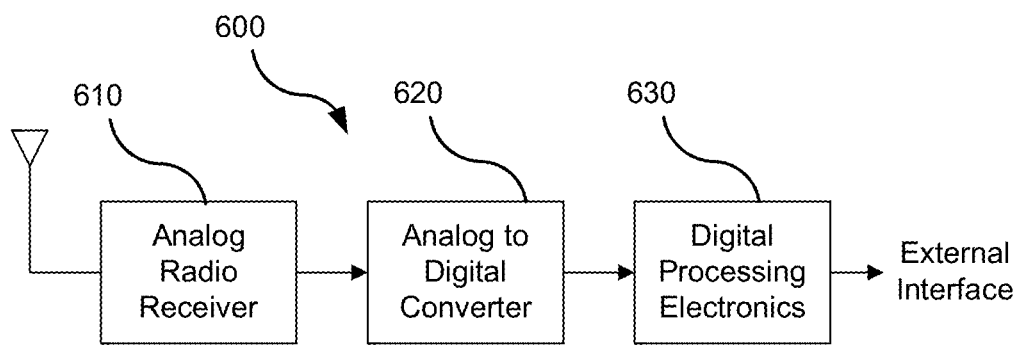
FIG. 6 is an illustration of a location server according to the preferred embodiment.

A location server 600 according to the preferred embodiment is illustrated in FIG. 6. The location server 600 comprises an analog radio receiver 610, an analog to digital converter 620, and digital processing electronics 630. The location server 600 processes the received data from the TOA reception nodes and uses this information to estimate the location of mobile nodes (step 240). The location server 600 may also perform other functions such as performing and/or reporting system diagnostics and recording and formatting sensor data from the system. The digital processing electronics 630, on which the location estimation and any other processing are implemented, are therefore more powerful than the digital processing electronics 430 of either an anchor node or a beacon node.

Figure 3:
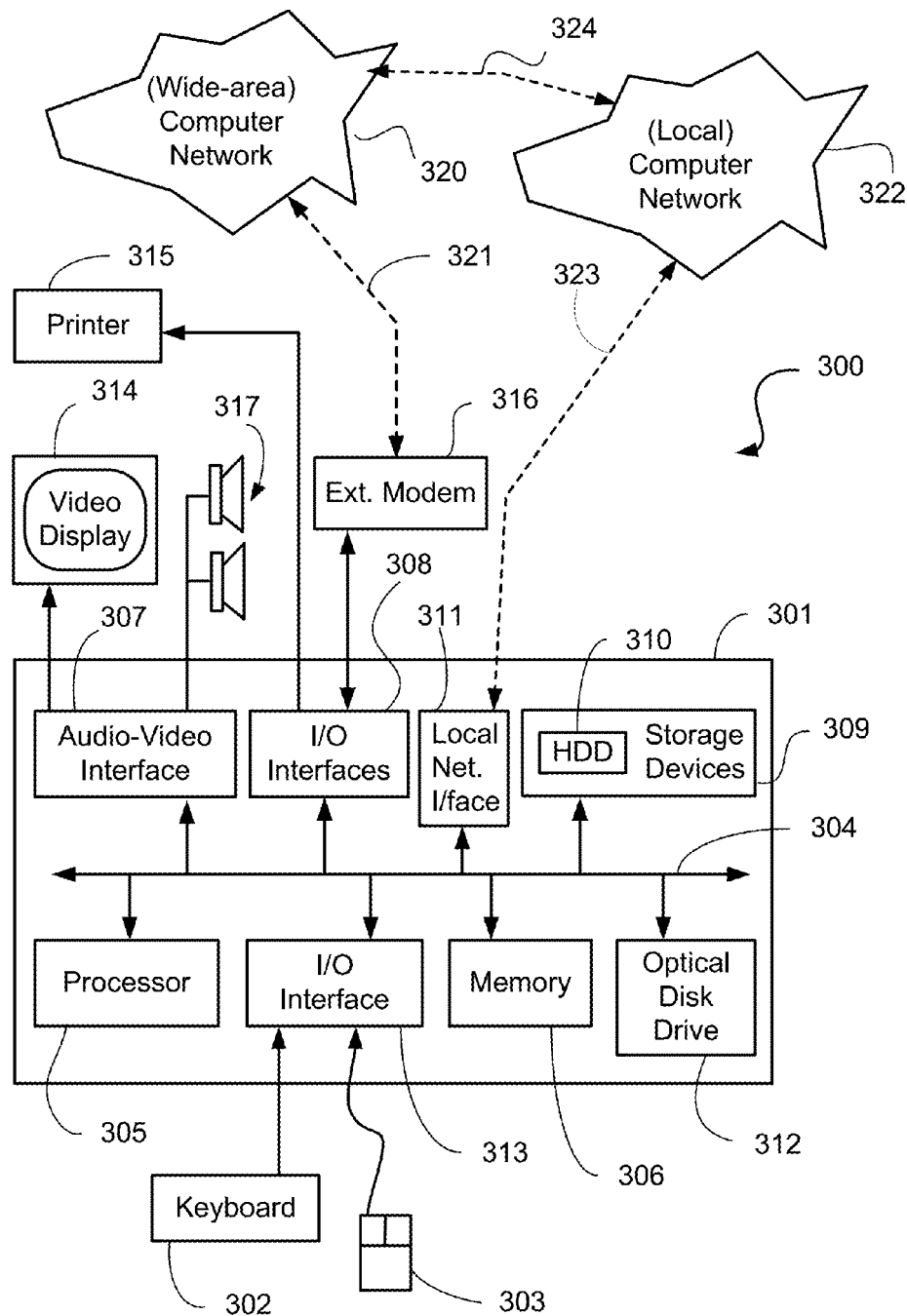
FIG. 3 is a schematic block diagram of a general purpose computer upon which disclosed methods can be practised.

In one embodiment, the digital processing electronics 630 comprises the digital processing electronics 430 of an anchor node connected via a USB interface to a general purpose computer system 300 such as that shown in FIG. 3, wherein the processing of step 240 may be implemented as software, such as one or more application programs executable within the computer system 300. In particular, the processing of step 240 is effected by instructions in the software that are carried out within the computer system 300. The instructions may be formed as one or more code modules, each for performing one or more particular tasks. The software may also be divided into two separate parts, in which a first part and the corresponding code modules performs the location estimation processing and a second part and the corresponding code modules manage an interface between the first part and other systems. The software may be stored in a computer readable medium, including the storage devices described below, for example. The software is loaded into the computer system 300 from the computer readable medium, and then executed by the computer system 300. A computer readable medium having such software or computer program recorded on it is a computer program product. The use of the computer program product in the computer system 300 preferably effects an advantageous apparatus for estimating the location of mobile nodes.

As seen in FIG. 3, the computer system 300 is formed by a computer module 301, input devices such as a keyboard 302 and a mouse pointer device 303, and output devices including a printer 315, a display device 314 and loudspeakers 317. An external Modulator-Demodulator (Modem) transceiver device 316 may be used by the computer module 301 for communicating to and from a communications network 320 via a connection 321.

The computer module 301 typically includes at least one processor unit 305, and a memory unit 306 for example formed from semiconductor random access memory (RAM) and read only memory (ROM). The module 301 also includes a number of input/output (I/O) interfaces including an audio-video interface 307 that couples to the video display 314 and loudspeakers 317, an I/O interface 313 for the keyboard 302 and mouse 303 and optionally a joystick (not illustrated), and an interface 308 for the external modem 316 and printer 315. In some implementations, the modem 316 may be incorporated within the computer module 301, for example within the interface 308. The computer module 301 also has a local network interface 311 which, via a connection 323, permits coupling of the computer system 300 to a local computer network 322, known as a Local Area Network (LAN). As also illustrated, the local network 322 may also couple to the wide network 320 via a connection 324, which would typically include a so-called "firewall" device or similar functionality. The interface 311 may be formed by an Ethernet™ circuit card, a wireless Bluetooth™ or an IEEE 802.11 wireless arrangement.

The interfaces 308 and 313 may afford both serial and parallel connectivity, the former typically being implemented according to the Universal Serial Bus (USB) standards and having corresponding USB connectors (not illustrated). Storage devices 309 are provided and typically include a hard disk drive (HDD) 310. Other devices such as a floppy disk drive, a flash memory drive, and a magnetic tape drive (not illustrated) may also be used. An optical disk drive 312 is typically provided to act as a non-volatile source of data. Portable memory devices, such optical disks (eg: CD-ROM, DVD), USB-RAM, and floppy disks for example may then be used as appropriate sources of data to the system 300.

The components 305, to 313 of the computer module 301 typically communicate via an interconnected bus 304 and in a manner which results in a conventional mode of operation of the computer system 300 known to those in the relevant art. Examples of computers on which the described arrangements can be practised include IBM-PC's and compatibles, Sun Sparcstations, Apple Mac™ or like computer systems evolved therefrom.

Typically, the application programs discussed above are resident on the hard disk drive 310 and read and controlled in execution by the processor 305. Intermediate storage of such programs and any data fetched from the networks 320 and 322 may be accomplished using the semiconductor memory 306, possibly in concert with the hard disk drive 310. In some instances, the application programs may be supplied to the user encoded on one or more CD-ROM and read via the corresponding drive 312, or alternatively may be read by the user from the networks 320 or 322. Still further, the software can also be loaded into the computer system 300 from other computer readable media. Computer readable media refers to any storage medium that participates in providing instructions and/or data to the computer system 300 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 301. Examples of computer readable transmission media that may also participate in the provision of instructions and/or data include radio or infrared transmission channels as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon the display 314. Through manipulation of the keyboard 302 and the mouse 303, a user of the computer system 300 and the application may manipulate the interface to provide controlling commands and/or input to the applications associated with the GUI(s).

The digital processing electronics 630 may alternatively be dedicated hardware such as one or more integrated circuits performing the functions or sub functions of the step 240. Such dedicated hardware may include graphic processors, digital signal processors, or one or more microprocessors and associated memories with data interfaces (e.g. WLAN or USB or serial interface) but no user interface devices. The digital processing electronics 430 of the beaconing/TOA reception node 400 is also preferably dedicated hardware of this kind.

To perform the location estimation of step 240, the location server 600 can utilise round trip or mobile transmit localisation, depending on the specifics of the application. An advantage of mobile transmit localisation for tracking objects moving at high velocity is that this approach only uses a single beacon, and is thus only affected by motion for the duration of the beacon (preferably about 0.5 ms). For round trip localisation, the estimation requires all beacons to and from the mobile node in a superframe, which may be extended over a significant period of time (up to 100 ms where 20 slots of 5 ms are used). It is described below how the effect of constant velocity motion can be corrected for under round trip localisation. A tradeoff in the choice of the localisation algorithm is that round trip localisation results are degraded by non-constant velocity motion over the superframe, while mobile transmit localisation results are degraded by errors in anchor node time synchronisation.

Factors such as mobile node velocity and hardware constraints determine the selection of the localisation algorithm. The location server 600 can implement multiple localisation algorithms simultaneously, as in the following exemplary scenarios:

- The system may have more than one type of mobile node, one capable of measurement of TOA in real time (TOA reception node) and another not (beaconing node). The former type is more accurate but is larger and has a shorter battery life. Both use the same beacon format 450; however, the latter type does not put the measured TOA values into the beacon data payload 470. The location server detects from the received beacon whether the mobile node is a TOA reception node or not, and selects either round trip or mobile transmit localisation respectively.
- A mobile node may not be capable of measuring TOA at the normal update rate, due to constraints in processing capability, but may be able to measure TOA at a reduced rate. In this case the location server uses mobile transmit localisation, but occasionally uses round trip localisation so that the propagation delay of the mobile node can be determined.
- A mobile node may both a beaconing node and a TOA reception node, and with any change in data from the mobile node the location server 600 can select whether to use round trip or mobile transmit localisation. The selection could be made based on estimated mobile velocity, or it could be based on an estimate of the localisation accuracy for both algorithms as determined by the location server.

Figure 7:
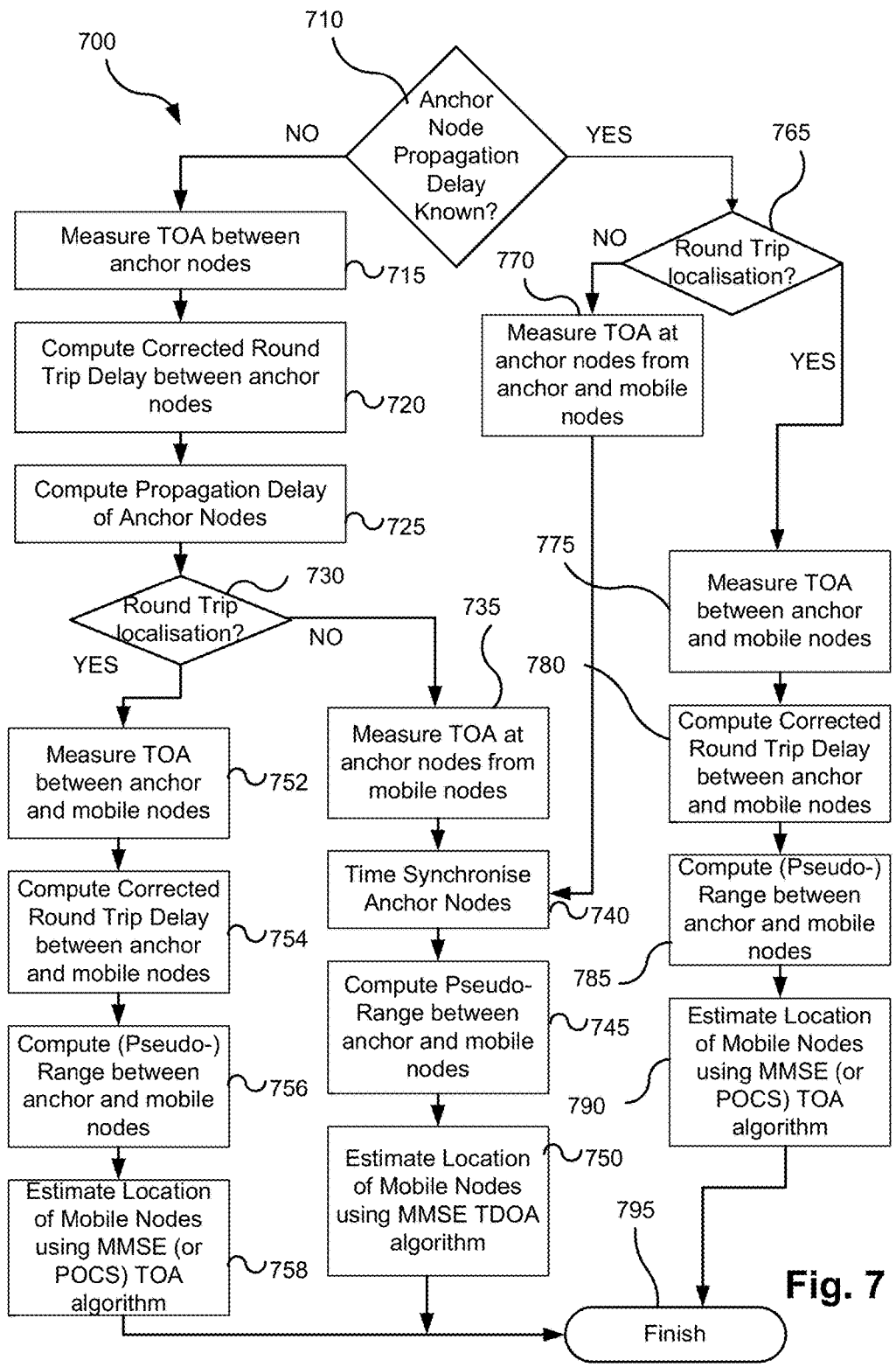
FIG. 7 is a flow diagram illustrating a method of estimating the location of mobile nodes according to the preferred embodiment.

The following sections describe in detail methods for localisation and tracking of mobile nodes based on round trip localisation and mobile transmit localisation. FIG. 7 is a flow diagram illustrating a method 700 according to the preferred embodiment of estimating the location of mobile nodes. The main decisions in the method 700 are whether the propagation delay of the anchor nodes is known from prior calibration, and whether mobile transmit or round trip localisation is used. In the case of round trip localisation with known anchor node propagation delay values, there is the further choice of using a MMSE-based or POCS-based localisation algorithm. These choices may be made dynamically, each time the method 700 is executed, or in advance, in which case only the relevant portions of the method 700 need be implemented.

The steps of the method 700 are mostly carried out by the location server 600, except for TOA measurement steps 715, 752, 735, 770, and 775 which are done by beaconing nodes and TOA reception nodes 400, and the results sent to the location server 600, as shown by the method 200. The method 700 starts at step 710 where it is determined whether the propagation delay of the anchor nodes is known from prior calibration. If not, the method 700 proceeds to step 715 at which the TOA at each anchor node from all other anchor nodes is measured. In step 720 the corrected round trip delay between each pair of anchor nodes is computed as described below. Step 725 follows, at which the propagation delay at each anchor node is computed as described below. Next, it is checked at step 730 whether round trip localisation is to be used. If not, step 735 measures the TOA at each anchor node from each mobile node. Step 740 follows, at which the anchor nodes are time synchronised as described below. The Pseudo-Range (see below) between all anchor and mobile nodes is then computed at step 745 as described below, after which at step 750 a robust MMSE-based Time Difference of Arrival (TDOA) algorithm described below is used to estimate the location of each mobile node. The method 700 then concludes at step 795.

If round trip localisation is to be used in the case where anchor node propagation delays were not known from prior calibration (but were instead computed in steps 715 to 725), step 752 measures the TOA at each anchor node from each mobile node, and vice versa. Then at step 754, the method 700 computes the Corrected Round Trip Delay between each anchor node and each mobile node as described below. Step 756 follows, at which the Pseudo-Range between all anchor and mobile nodes is computed as described below. Finally at step 758 a robust MMSE-based TOA algorithm, described below, is used to estimate the location of each mobile node. If the propagation delay at the mobile nodes is known, step 756 computes range rather than pseudo-range, and step 758 would use either a robust MMSE-based or a POCS-based TOA algorithm, to be described below, to estimate the location of each mobile node from the computed ranges. However, the propagation delay at the mobile nodes is unlikely to be known as the propagation delay of the anchor nodes was initially unknown. The method 700 then concludes at step 795.

In the case where the propagation delay of the anchor nodes is known, step 765 checks whether round trip localisation is to be used. If not, step 770 measures the TOA at each anchor node from all other anchor nodes and all mobile nodes. The method 700 then continues from step 740 as described above.

If round trip localisation is to be used, step 775 measures the TOA at each anchor node from each mobile node, and vice versa. Then at step 780, the method 700 computes the Corrected Round Trip Delay between each anchor node and each mobile node as in step 754. Step 785 follows, at which the range between all anchor and mobile nodes is computed (assuming the propagation delay at the mobile nodes is known, which is likely since the propagation delay at the anchor nodes is known). Finally at step 790 the robust MMSE- or POCS-based TOA algorithm is used to estimate the location of each mobile node, as in step 758. If the propagation delay at the mobile nodes is unknown, step 785 computes Pseudo-Range rather than range, and step 790 can only use the robust MMSE-based TOA algorithm, as in step 758. The method 700 then concludes at step 795.

Round Trip Localisation

Next, a method will be described for measurement of round trip delay between a pair of nodes, with correction for motion and frequency offset. This method is used at steps 720, 754, and 780 of the method 700, and provides the basis for round trip localisation and computation of anchor node propagation delay (step 725).

Figure 8A:
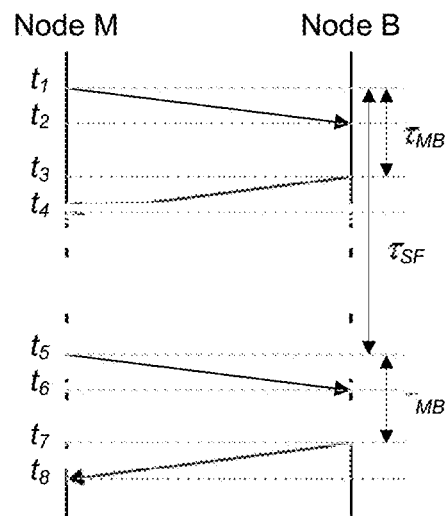
FIG. 8a illustrates a sequence of beacon transmissions.

The two nodes are labelled as M (typically, but not necessarily, a mobile node) and B (an anchor node). Node M transmits a beacon first, followed by node B after a delay of $\tau_{MB}$ determined by the beacon schedule (see FIG. 5). After a delay of $\tau_{SF}$ (the superframe length), this sequence is repeated, as illustrated in FIG. 8a. The beacons are transmitted at times $t_1$, $t_3$, $t_5$ and $t_7$, and received at times $t_2$, $t_4$, $t_6$ and $t_8$. The difference between the transmit time and the receive time, e.g. $t_2-t_1$, is the sum of the propagation delay through the transmitter electronics ($\Delta_i^{tx}$ where i can be M or B), the propagation time through the air ($d_{ij}/c$ where $d_{ij}$ is distance between the two nodes, c is speed of light, and j can be B or M), and the propagation delay through the receiver electronics ($\Delta_j^{rx}$).

The imperfections in the system are:

Time measurements are with respect to the local clock on the respective nodes. The local clocks at the nodes are not time or frequency synchronised, and this error can be modeled using the relationship between true time $t_i$ and the measured time at node j, $t_i^j$, which is $t_i^j = \alpha_j(t_i - t_{0,j})$, where $\alpha_j$ is the ratio of local clock frequency to true frequency (close to unity, since temperature compensated crystal oscillators are preferably used to set time that remain within 1 part per million of the true frequency) and $t_{0,j}$ is the time offset, i.e. the true time at which the local clock at node j commences its count.

A node can only measure its own transmit and receive times, so for example $t_2^M$ does not exist.

Figure 8B:
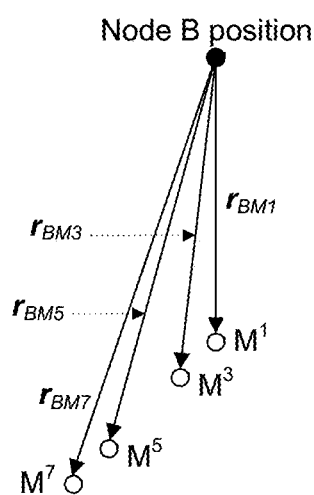

The mobile node may be moving, with a significant displacement occurring between the transmissions of the beacons from both nodes. This is illustrated in FIG. 8b where $M^i$ is the location of the mobile node at time $t_i$. It can be assumed that the motion of the mobile node is negligible in the short time interval between transmission ($t_1$) and reception ($t_2$) of a beacon. In this diagram $r_{ij}$ is a vector between nodes i and j and $d_{ij} = \|r_{ij}\|$.

An estimate of the frequency difference between the pair of nodes can be made at node M as follows:

$$D_M = \frac{(t_8^M - t_7^B) - (t_4^M - t_3^B)}{t_8^M - t_4^M} = \qquad (1)$$

$$(\alpha_M - \alpha_B) + \alpha_A \frac{d_{BM7} - d_{BM3}}{c\tau_{SF}} \cong \alpha_{MB} + \delta_{MB},$$

where $$\delta_{MB} = \frac{d_{BM7} - d_{BM3}}{c\tau_{SF}}. \qquad (2)$$

$\alpha_{MB}$ is the frequency offset of the local clocks of the node pair, and $\delta_{MB}$ is the Doppler frequency shift due to the radial component of the relative motion between the node pair. An estimate of the frequency difference at node B can likewise be made:

$$D_B = \frac{(t_6^B - t_5^M) - (t_2^B - t_1^M)}{t_6^B - t_2^B} \cong -\alpha_{MB} + \delta_{MB}. \quad (3)$$

Note that using $D_M$ and $D_B$ the effects of frequency offset and relative motion can be separated as follows:

$$\alpha_{MB} = \frac{D_M - D_B}{2}$$

$$\delta_{MB} = \frac{D_M + D_B}{2}$$

Using the $\delta_{MB}$ terms between a mobile node and multiple anchor nodes it is possible to estimate the velocity of the mobile node without determining range or location.

The round trip delay measurement requires measurements in both directions between the pair of nodes. The uncorrected round trip delay, using the first pair of beacons in FIG. 8a, is:

$$T_{MB} = (t_4^M - t_3^B) + (t_2^B - t_1^M)$$
$$= \tau_{MB}(\alpha_M - \alpha_B) + \alpha_M(\Delta_B^{tx} + \Delta_M^{rx}) + \alpha_B(\Delta_M^{tx} + \Delta_B^{rx}) +$$
$$\alpha_M \frac{d_{BM3}}{c} + \alpha_B \frac{d_{BM1}}{c}$$
$$\approx \tau_{MB}\alpha_{MB} + \Delta_M + \Delta_B + 2\frac{d_{BM1}}{c} + \frac{d_{BM3} - d_{BM1}}{c}$$

where $\Delta_i = \Delta_i^{tx} + \Delta_i^{rx}$. Assuming that relative velocity between the nodes is constant over the interval $\tau_{SF}$ (i.e. between mobile node locations $M^1$ and $M^5$ in FIG. 8b) and that the displacement over this interval is small relative to distance $d_{BM}$, the last term may be approximated as $$\frac{d_{BM3} - d_{BM1}}{c} \cong \frac{\tau_{MB}}{\tau_{SF}} \cdot \frac{d_{BM7} - d_{BM3}}{c} = \tau_{MB}\delta_{MB}. \quad (4)$$

Hence $$T_{MB} \cong \tau_{MB}\alpha_{MB} + \Delta_M + \Delta_B + 2\frac{d_{BM1}}{c} + \tau_{MB}\delta_{MB}$$
$$= 2\frac{d_{BM1}}{c} + \Delta_M + \Delta_B + \tau_{MB}D_M$$

The quantity $$2\frac{d_{BM1}}{c}$$

is the corrected round trip delay. The quantities $T_{MB}$ and $D_M$ (equation (1)) are directly determined from the measured data, and $\tau_{MB}$ is known from the beacon TDMA schedule; if not, it can be readily estimated from the TOA data as follows:

$$\tau_{MB} \cong \frac{(t_4^M + t_3^B) - (t_2^B + t_1^M)}{2}$$

The location of the mobile node (hence $d_{BM1}$) is unknown, and the propagation delay $\Delta_i$ for each node may be unknown.

In round trip localisation (steps 758 and 790 of method 700), corrected round trip delay measurements are first made between anchor nodes and mobile nodes (steps 754 and 780). The use of round trip delay measurements for removing the requirement for time synchronisation is well known, but using the corrected round trip delay computed as below, the effects of frequency offset and relative motion can also be removed. An important feature of this correction for motion and frequency offset is that it is applied locally to each node pair, and no global processing is required. Note that the motion is corrected to the time at which the mobile node transmits, hence all ranges between this mobile node and multiple anchor nodes are corrected to the same time, compensating for the effect of constant velocity motion.

The propagation delay $\Delta_B$ of the anchor nodes is either known from prior calibration or computed at step 725 using corrected round trip delay measurements between anchor nodes as described below. In localisation according to the present disclosure, round trip measurements between mobile nodes are not used, but these measurements may be used for other purposes, e.g. cooperative localisation.

If the propagation delay $\Delta_M$ of the mobile node is known, then from equation (4) the corrected round trip delay $$2\frac{d_{BM1}}{c}$$

(step 780 or 754) is $T_{MB} - \Delta_M - \Delta_B - \tau_{MB}D_M$. The range between the pair of nodes is therefore computed (step 785 or 756) as:

$$d_{BM} \cong c \cdot \frac{T_{MB} - \Delta_M - \Delta_B - \tau_{MB}D_M}{2}. \quad (5)$$

From a set of such ranges (minimum 3 for 2D localisation or 4 for 3D localisation) to anchor nodes at known locations, the location of the mobile node is estimated (step 790 or 758).

If the propagation delay $\Delta_M$ of the mobile node is not known, then from equation (4) the corrected round trip delay $$2\frac{d_{BM1}}{c} + \Delta_M$$

(step 754 or 780) is $T_{MB} - \Delta_B - \tau_{MB}D_M$. The pseudo-range between the pair of nodes is therefore computed (step 756 or 785) as:

$$P_{BM} = d_{BM} + \frac{c\Delta_M}{2} \cong c \cdot \frac{T_{MB} - \Delta_B - \tau_{MB}D_M}{2}. \quad (6)$$

All pseudo-ranges are offset from genuine ranges by a constant value of $c\Delta_M/2$; thus there is an extra unknown ($\Delta_M$) that needs to be solved for in step 758 or 790. Therefore, the minimum number of pseudo-range measurements is 4 for 2D localisation and 5 for 3D localisation. The solution is mathematically the same as Time Difference of Arrival (TDOA) localisation used at step 750 (which solves for an unknown transmit time), described below.

Three algorithms for round trip localisation are described below:

Robust Minimum Mean Square Error (MMSE) (step 758 and 790), estimating mobile node location and mobile node propagation delay from pseudo-range values. This is good for calibration of mobile node propagation delay, but is typically not used in multipath environments.

Robust Minimum Mean Square Error (step 790 and 758), estimating mobile node location from range values with a known value of mobile node propagation delay.

Projection onto Convex Sets (POCS) algorithm (step 790 and 758), estimating mobile node location from range values with a known value of mobile node propagation delay.

This works well when multipath causes a positive bias on many range estimates.

Pre-Filtering of Range Data

Pre-filtering of the range data improves localisation accuracy by eliminating bad measurements prior to the localisation steps 758 and 790. Given multiple measurements of the range $d_{BM}$ between an anchor node and a mobile node taken over a period of seconds, an improved estimate of the true range at any given time can be determined by a variety of filtering and interpolation operations. Applying these operations prior to estimation of the node location using either the POCS or MMSE approaches described below can result in improved estimation accuracy. Because these operations act on the range data before the localisation step, the result is quite different to applying a filter (such as a Kalman filter or non-linear filter) to the estimated locations. The benefits of pre-filtering are:

Interpolation of missing range data. In some environments, breakdown in the data communications may result in occasional missing measurements. As a result, there may be an insufficient number of ranges to estimate the location of the mobile node. This can be overcome by interpolating or extrapolating the missing range data from previous or subsequent measurements for the anchor and mobile node pair.

Filtering of range data to reduce noise and/or remove bad measurements.

Any of a number of filtering operations can be applied to the range data, taking into account a priori information about the characteristics of the motion of the mobile node. Such filtering may include for example linear filters (e.g. low pass filter and Kalman filter) or non-linear filters (e.g. median filter). In an indoor environment with strong multipath propagation and many walls, the direct path is often lost, resulting in range estimates that are longer than the true range. To deal with this situation, a nonlinear filter which replaces infeasible measurements with a value extrapolated from past measurements can be used. One embodiment of such a filter limits the maximum difference in range between the minimum range from of any of the previous 5 super-frames and the range from the current superframe.

The same filtering operations can be applied to pseudo-range data between a given mobile node and anchor nodes, as the distance offset between the pseudo-range and the (unknown) true range is the same for each of these measurements.

Round Trip Localisation using Robust MMSE

The MMSE cost function to estimate the mobile node location using the range measurements between a mobile node and K anchor nodes (step 758 or 790) is $$\hat{x}_M = \arg\left[\min_{x_M} \sum_{i=1}^{K} w_i (d_{iM} - \|x_i - \hat{x}_M\|)^2\right] \quad (7)$$

where $w_i$ is an optional weight that is preferably inversely proportional to the noise variance in the range measurement. The locations $x_i$ of the anchor nodes are known.

In the case that the propagation delay of the mobile node is not known, the mobile node location and propagation delay are estimated from the pseudo-range measurements (step 758 or 790) as $$\hat{x}_M = \arg\left[\min_{x_M, \Delta_M} \sum_{i=1}^{K} w_i \left(p_{iM} - \frac{c\Delta_M}{2} - \|x_i - \hat{x}_M\|\right)^2\right] \quad (8)$$

Finding the minimising argument of either cost function is a non-linear problem with many solution strategies. An initial linear solution followed by one or more non-linear iterations using a Taylor expansion (usually less than five iterations are required) is preferable.

To make the solution more robust, bad range measurements (e.g. ones with a significant bias due to multipath) are preferably removed from consideration. An algorithm for doing this is given by the pseudocode in Appendix A. The location and the error in the location estimate are computed at line 5. If the error is less than a threshold, or the number of ranges is less than or equal to a minimum number, the "repeat" loop at line 4 terminates. Each range or pseudo-range measurement is then excluded in turn at line 9, which recomputes the location and the error in the location estimate with the remaining range or pseudo-range measurements. After applying a small bias towards using more measurements (k is less than one, with 0.9 often a good choice) at line 13, if the minimum such location error is smaller than the original, all-in error computed at line 5, then the 'bad' measurement is removed (line 14). The "repeat" loop at line 4 continues until no measurements are removed in an iteration (line 16).

The location error estimate is computed as the product of an estimate of the range error and the GDOP (geometric dilution of precision) and is given by:

$$\hat{E}_M = GDOP \cdot \sqrt{\frac{\sum_{i=1}^{K}(d_{iM} - \|x_i - \hat{x}_M\|)^2}{K-2}}. \quad (9)$$

Where the pseudo-range is measured, $$d_{iM} = p_{iM} - \frac{c\Delta_M}{2}$$

using the computed value of $\Delta_M$. Equation (9) is based on the simplifying assumption that the noise in the range (or pseudo-range) measurements is independent and identically distributed, which while not strictly true has been found to work very well with real data. The GDOP is calculated as a Cramer-Rao lower bound (see e.g. Larsson, E. G., "Cramer-Rao bound analysis of distributed positioning in sensor networks," *IEEE Signal Processing Letters*, vol. 11, no. 3, pp. 334-337, March 2004). This calculation depends upon the location of the anchor nodes, and whether or not the mobile node propagation delay is being estimated.

Round Trip Localisation using POCS

The other round-trip localisation approach is the Projection Onto Convex Sets (POCS) algorithm (step 758 or 790), where each constraint set is a circle centred on an anchor node with the radius given by the estimated range to that anchor node. The POCS algorithm may be extended to 3 dimensional locations by taking the constraint sets as spheres rather than circles. Unlike the MMSE algorithm, which penalises mobile node locations quadratically for their distance from the estimated range, the POCS algorithm applies no penalty for the range to the mobile node being less than or equal to the estimated range. As a result, the POCS algorithm gives good results when large positive errors are likely, such as in indoor environments where the direct path may be severely attenuated by intervening walls.

Figure 9:
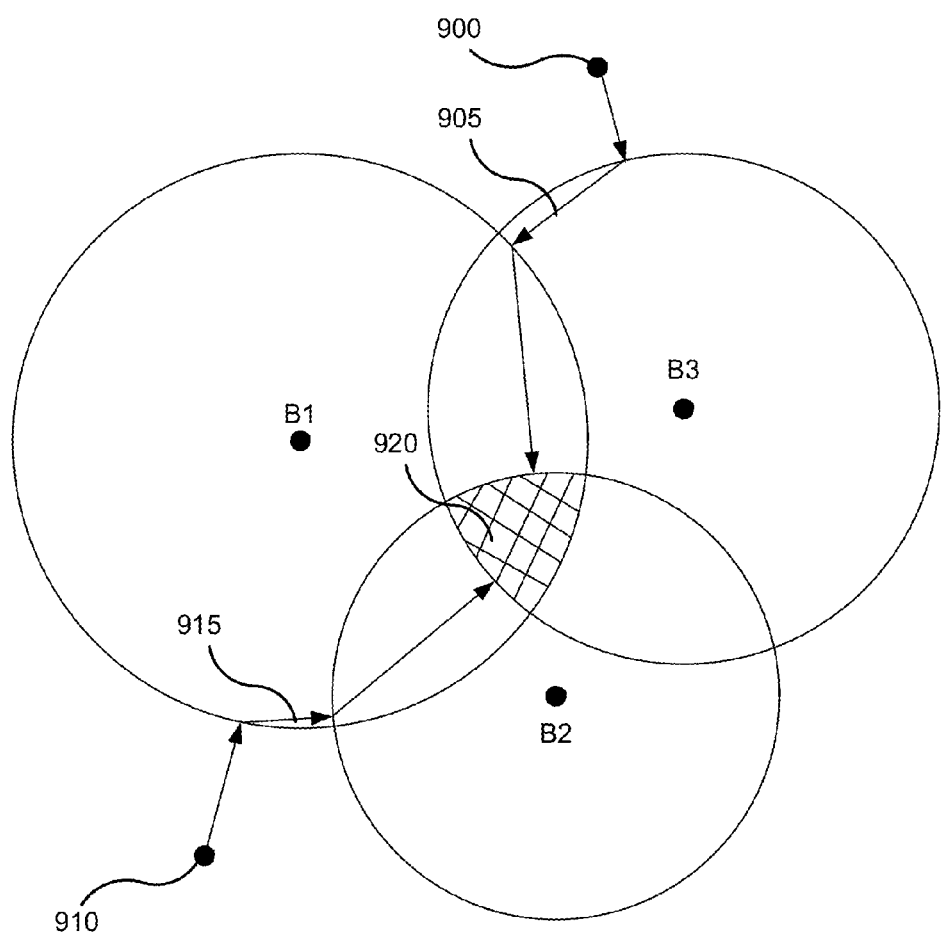
FIG. 9 illustrates the estimation of the location of a node according to the POCS algorithm in an example scenario; and Appendix A contains pseudocode for a robust MMSE algorithm for estimating the location of a mobile node.

A point in the intersection of the constraint sets is found by an iterative process, illustrated in FIG. 9. Constraints sets for three anchor nodes labelled B1, B2 and B3 are shown as circles centred at each anchor node, with radii equal to the respective ranges from each anchor node. A random starting point, e.g. 900 or 910, is updated by projecting onto each of the constraint sets in turn. After a small number of iterations (generally less than 10), the point will be in the (shaded) intersection region 920 of the constraint sets. The end point of the path is recorded. The path 915 is taken by the starting point 910 as it is projected onto the constraint sets associated with B1, B2 and B3 in turn. A second path 905 is taken by a starting point 900 as it is projected onto the sets associated with B3, B1 and B2 in turn.

The intersection of the constraint sets may be empty. This can be detected by determining whether the end point is not inside all the constraint sets after a substantial number of iterations (preferably 20). There are several possible ways of dealing with this case. In one approach, the ranges to one or more of the anchor nodes are increased by a small amount and the constraint set intersection is recomputed. This is repeated until the intersection of the constraint sets is non-empty. In an alternative approach, a number of different starting points are chosen, and the POCS algorithm is run for a fixed number of iterations for each starting point, and the resulting end points are averaged. In yet another approach, only a single starting point is used, and the solution point is given by the average of the end points over a number of steps of the iterative algorithm.

Just as the intersection of the constraint sets may be empty, it may also be very large, indicated by determining whether multiple end points are widely dispersed. This can be dealt with using strategies similar to those for the case of an empty intersection discussed above. In one approach, the range to at least one of the anchor nodes is decreased and the POCS algorithm run again. This is repeated until the intersection region shrinks to a small size. Alternatively, the end point for multiple different starting points may be averaged to estimate the centroid of the constraint set intersection region. In FIG. 9, the end point for two different starting points is shown. Taking the median of several such end points gives a point near the centroid of the shaded intersection region. The median is the location estimate for the mobile node.

Mobile Transmit Localisation

In mobile transmit localisation (step 750), the location of a mobile node is estimated based on a single beacon from the mobile node to each anchor node. This requires time synchronisation of the anchor nodes (step 740) at the time at which the beacon is sent. If the propagation delay of the mobile node is known, it is possible to time synchronise the mobile node to the other nodes and what is generally called a TOA localisation algorithm may be used. However, when the mobile node is not also a TOA reception node, it is not possible to separate the effects of clock time offset and propagation delay, and if propagation delay is not known time synchronisation of the mobile node is impossible, in which case a Time Difference Of Arrival (TDOA) algorithm can be used to estimate the mobile node location. Even if time synchronisation of the mobile node is possible, the TDOA algorithm is preferred in step 750 to avoid this synchronisation step.

If the mobile node is time synchronised, given the transmit time from the mobile $t_M$ and a receive time at each anchor node i of $t_{rx,i}$ the measured range between the node pairs is given by $$d_{iM} = c(t_{rx,i} - t_M - \Delta_M^{tx} - \Delta_i^{rx}). \quad (10)$$

A set of such measurements can be used as input for the robust MMSE algorithm based on range described above with reference to equation (7). Note that it is not usually convenient to calculate the separate transmit and receive delays, so this localisation algorithm is preferably not used.

Not using the transmit time from the mobile node simplifies the problem, as the mobile node does not need to be time synchronised to the anchor nodes, nor is any propagation delay information for the mobile node needed. The measured pseudo-range (step 745) is $$p_{iM} = d_{iM} + c(t_M + \Delta_M^{tx}) = c(t_{rx,i} - \Delta_i^{rx}). \quad (11)$$

A set of such measurements can be used as input for the robust MMSE TDOA algorithm based on pseudo-range described above with reference to equation (8), except where above the unknown range offset was $c\Delta_M/2$, in this case it is $c(t_M + \Delta_M^{tx})$.

Propagation Delay at Anchor Nodes

The propagation delay of anchor nodes at known locations can be readily computed (step 725) using the corrected round trip delay $$2\frac{d_{ij}}{c}$$

between anchor nodes calculated at step 720. In equation (4), the distance between the anchor nodes i and j is known, as are $\tau_{ij}$ and $D_i$ using equation (1), so the only unknowns are the propagation delays of the two anchor nodes. For each measurement between anchor nodes i and j, equation (4) may be rewritten as $$T_{ij} - 2d_{ij}/c - \tau_{ij} D_i = \Delta_i + \Delta_j \quad (13)$$

where the terms on the left side are known. This can be written as a set of linear equations in the form $A\Delta = b$ where $\Delta$ is a column vector of $\Delta_i$ values and b is a column vector of the terms on the left side of equation (13). There are generally more measurements than unknowns, so the system is overdetermined, and the least squares solution is:

$$\Delta = (A^T A)^{-1} A^T b. \quad (14)$$

Anchor Node Synchronisation

The time offset between anchor nodes is continually changing due to the offset in node clock frequencies (which themselves vary over time). Hence, for the calculation of mobile node location using TDOA, the time offset between the anchor nodes needs to be determined at the time that the mobile node transmitted its beacon (step 740). Assume that anchor node i transmits a beacon at $t_1$ that is received by anchor node j at $t_2$. The difference between the measured receive and transmit times at time $t_1$ is $$t_2^j - t_1^i = \alpha_j(d_{ij}/c + \Delta_i^{tx} + \Delta_j^{rx} - t_{0,j}) + \alpha_i t_{0,i}$$

$$\approx t_{0,i} - t_{0,j} + d_{ij}/c + \Delta_i^{tx} + \Delta_j^{rx}.$$

The error in this approximation is insignificant. $d_{ij}$ is known as the anchor node locations are known, and $\Delta_i^{tx}$ and $\Delta_j^{rx}$ can be solved for, but are actually known from previous calibration or separate anchor node propagation delay calculation (step 725).

This difference needs to be adjusted to the time that the mobile node transmits, which is offset from $t_1$ by $\tau_{iM}$. It is assumed that the frequency offset is constant over this small time interval, hence shifting t=0 to the time at which the mobile node transmits yields $$t_{0,i} - t_{0,j} \approx t_2^j - t_1^i - d_{ij}/c - \frac{\Delta_i + \Delta_j}{2} - \alpha_{ij} \tau_{iM}. \quad (14)$$

This forms a generally overdetermined linear set of equations that can be solved for the time offsets $t_{0,i}$ arbitrarily setting one of the nodes to have zero offset and finding the least squares solution.

The value $\tau_{iM}$ can be measured using the receive time of the beacon from the mobile node at node i, however a more robust measurement is to form a least squares estimate of all beacon transmit times over all measurements in a superframe.

Variations

Two way ranging with correction for motion, frequency offsets between nodes and node propagation delay is useful in applications without also performing localisation (e.g. in underground mines).

Gating of data to remove measurements inconsistent with expected location or range.

Use of temporal filter (e.g. Kalman or particle filter) to reduce noise in mobile location.

Perform localisation using filter with input range or pseudo-range, not location.

Data fusion with other aiding sources (INS, GPS etc) to improve results.

It is apparent from the above that the arrangements described are applicable to the wireless localisation industries.

The foregoing describes only some embodiments of the present invention, and modifications and/or changes can be made thereto without departing from the scope and spirit of the invention, the embodiments being illustrative and not restrictive.

APPENDIX A

For each mobile node M
  Repeat
    Compute Mobile Node Location $\hat{x}_M$ and Location Error Estimate $\hat{E}_M$.
    If $\hat{E}_M$ less than threshold or number of ranges less than or equal to threshold
      Break (location of M is $\hat{x}_M$, go to next iteration of outer for loop)
    For each anchor node i
      Compute Mobile Node Location $\hat{x}_{M/i}$ and Location Error Estimate $\hat{E}_{M/i}$ after removing measurement $d_{iM}$ or $p_{iM}$
      Keep track of result ($i_{min}$, $\hat{x}_{M/i_{min}}$ and $\hat{E}_{M/i_{min}}$) with lowest location error estimate
    If $\hat{E}_{M/i_{min}} < k\hat{E}_M$
      Remove measurement $d_{i_{min}M}$ from further consideration as bad
    Else
      Break (location of mobile M is $\hat{x}_M$, go to next iteration of outer for loop)

The invention claimed is:

1. A method of estimating the location of a mobile object using a plurality of anchor nodes, the method comprising:
synchronising said plurality of anchor nodes;
measuring a plurality of times-of-arrival of beacons transmitted from said object to respective said anchor nodes; and
estimating the location of said object relative to said anchor nodes using said measured times-of-arrival, corrected for a propagation delay at each said anchor node,
wherein the step of estimating the location of said object relative to said anchor nodes comprises the sub-steps of:
subtracting respective propagation delays from each of said plurality of measured times-of-arrival to obtain respective pseudo-ranges forming a set of obtained pseudo-ranges;
estimating locations of said object and corresponding errors in respective said location estimates, wherein each estimated location is determined from a subset of the obtained pseudo-ranges, and wherein each subset of the obtained pseudo-ranges excludes one pseudo-range from the set of obtained pseudo-ranges; and
discarding each of the obtained pseudo-ranges whose exclusion gave an error estimate that is less than a threshold; and
estimating the location of said object from undiscarded pseudo-ranges, the undiscarded pseudo-ranges being those of the obtained pseudo-ranges that have not been discarded.

2. The method according to claim 1, wherein the step of synchronising said plurality of anchor nodes comprises the sub-steps of:
measuring a plurality of trip delays of beacons transmitted between said anchor nodes;
correcting said trip delays for propagation delays at said anchor nodes and frequency offsets between local clocks at respective said anchor nodes; and
determining a time offset of each said local clock from said corrected trip delays.

3. The method according to claim 1, wherein said threshold is an error estimate of a location estimate determined from all of the obtained pseudo-ranges.

4. The method according to claim 1, wherein said estimating sub-step comprises minimising a weighted sum over said anchor nodes of a squared difference between each pseudo-range and a distance between a candidate location and the location of a corresponding anchor node.

5. The method according to claim 1, wherein each of said error estimates in the estimated locations comprises an estimate of a pseudo-range error and a term relating the pseudo-range error to said error in the estimated location.

6. The method according to claim 1, wherein the discarding of the pseudo-ranges is performed until the number of the undiscarded pseudo-ranges reaches a minimum number.

7. The method of claim 1, wherein the step of estimating the location of said object relative to said anchor nodes further comprises the sub-step of estimating an offset common to all said obtained pseudo-ranges.

* * * * *